(12) United States Patent
Wildeman

(10) Patent No.: US 11,944,250 B2
(45) Date of Patent: *Apr. 2, 2024

(54) CLEANING SYSTEM INCORPORATING STITCH BONDED CLEANING PAD WITH MULTI-FILAMENT STITCHES

(71) Applicant: TIETEX INTERNATIONAL, LTD., Spartanburg, SC (US)

(72) Inventor: Martin Wildeman, Spartanburg, SC (US)

(73) Assignee: Tietex International Ltd., Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/963,049

(22) Filed: Oct. 10, 2022

(65) Prior Publication Data

US 2023/0036255 A1 Feb. 2, 2023

Related U.S. Application Data

(63) Continuation of application No. 17/181,545, filed on Feb. 22, 2021, now Pat. No. 11,464,386, which is a
(Continued)

(51) Int. Cl.
| | |
|---|---|
| *A47L 13/256* | (2006.01) |
| *A47L 13/20* | (2006.01) |
| *A47L 13/44* | (2006.01) |
| *D04H 1/4291* | (2012.01) |
| *D04H 1/435* | (2012.01) |
| *D04H 1/52* | (2006.01) |
| *D04H 1/00* | (2006.01) |

(52) U.S. Cl.
CPC .............. *A47L 13/256* (2013.01); *A47L 13/20* (2013.01); *A47L 13/44* (2013.01); *D04H 1/4291* (2013.01); *D04H 1/435* (2013.01); *D04H 1/52* (2013.01); *D04H 1/00* (2013.01); *Y10T 428/23929* (2015.04); *Y10T 428/23936* (2015.04); *Y10T 428/23957* (2015.04)

(58) Field of Classification Search
CPC ........ A47L 13/20; A47L 13/256; D04H 1/435
See application file for complete search history.

(56) References Cited

U.S. PATENT DOCUMENTS

| | | | | |
|---|---|---|---|---|
| 4,643,730 | A * | 2/1987 | Chen ................... | A61F 13/5638 427/501 |
| 9,049,974 | B2 * | 6/2015 | Wildeman .............. | A47L 13/44 |

(Continued)

*Primary Examiner* — Michael D Jennings
(74) *Attorney, Agent, or Firm* — J. M. Robertson, LLC

(57) ABSTRACT

A cleaning pad structure of stitch bonded construction incorporating one or more substrate layers of an absorbent nonwoven material with an optional additional fluid blocking substrate layer of polymer film or other suitable material in juxtaposed relation to the absorbent nonwoven layers. Stitching yarns are introduced in stitching relation through the substrate layers. One face of the pad defines a cleaning surface of raised yarn loops formed by the stitched yarns. The pad further includes an attachment surface facing away from the cleaning surface. The stitches of yarns across the attachment surface define an engagement surface for attachment to cooperating hooking elements across a surface of a mop head to define a hook and loop attachment system.

13 Claims, 5 Drawing Sheets

Related U.S. Application Data continuation of application No. 16/023,613, filed on Jun. 29, 2018, now Pat. No. 10,925,457, which is a continuation of application No. 15/640,921, filed on Jul. 3, 2017, now Pat. No. 10,010,233, which is a continuation of application No. 14/733,551, filed on Jun. 8, 2015, now Pat. No. 9,693,668, which is a continuation of application No. 14/517,228, filed on Oct. 17, 2014, now Pat. No. 9,049,974, which is a continuation of application No. 12/761,818, filed on Apr. 16, 2010, now Pat. No. 8,863,347.

(60) Provisional application No. 61/170,310, filed on Apr. 17, 2009.

(56) References Cited

U.S. PATENT DOCUMENTS

| | | | | |
|---|---|---|---|---|
| 2010/0263152 | A1* | 10/2010 | Wildeman | A47L 13/20 |
| | | | | 15/228 |
| 2015/0272418 | A1* | 10/2015 | Wildeman | A47L 13/44 |
| | | | | 15/228 |
| 2017/0296025 | A1* | 10/2017 | Wildeman | D04H 1/4291 |

* cited by examiner

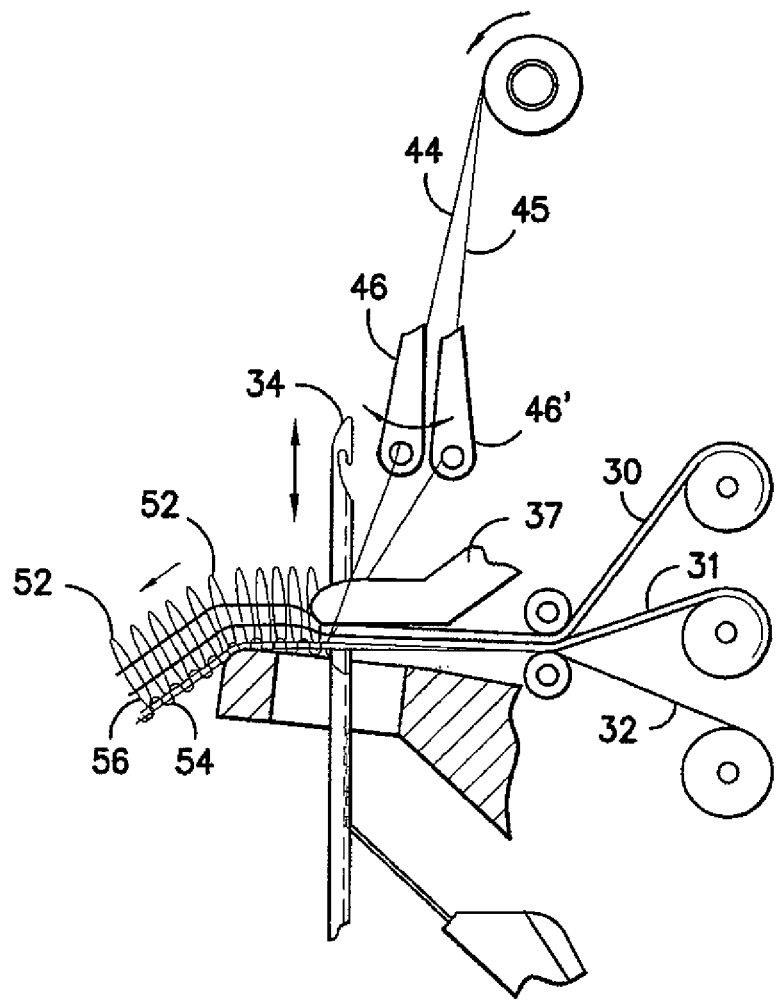
FIG. -1-

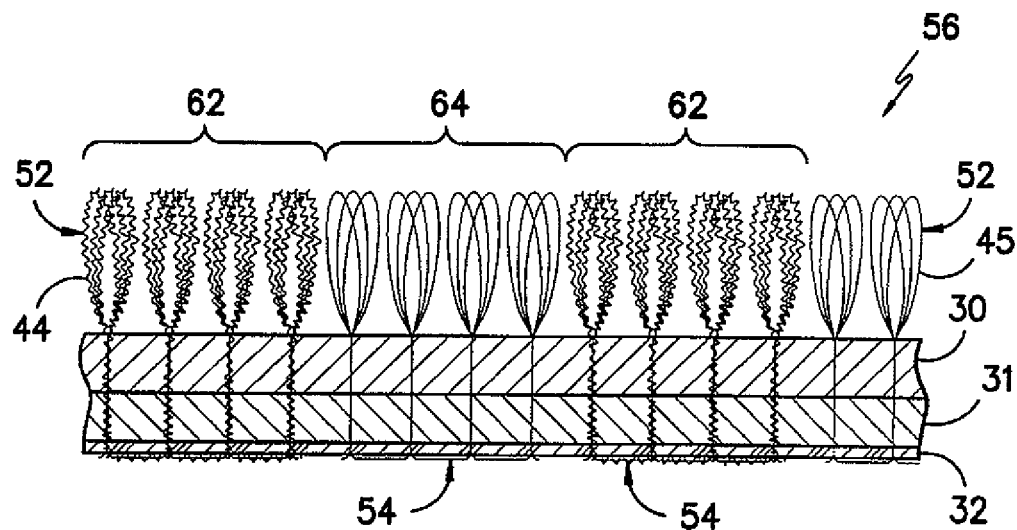
FIG. -2-
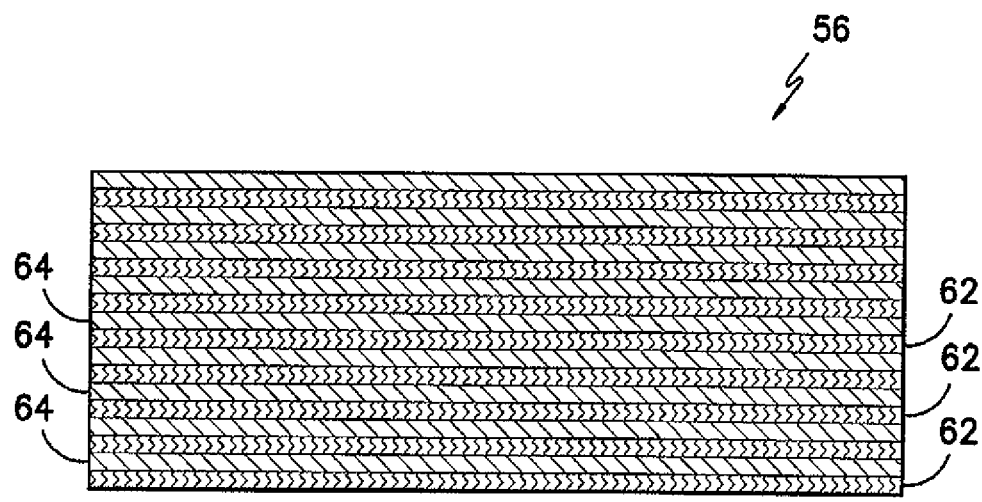
FIG. -3-

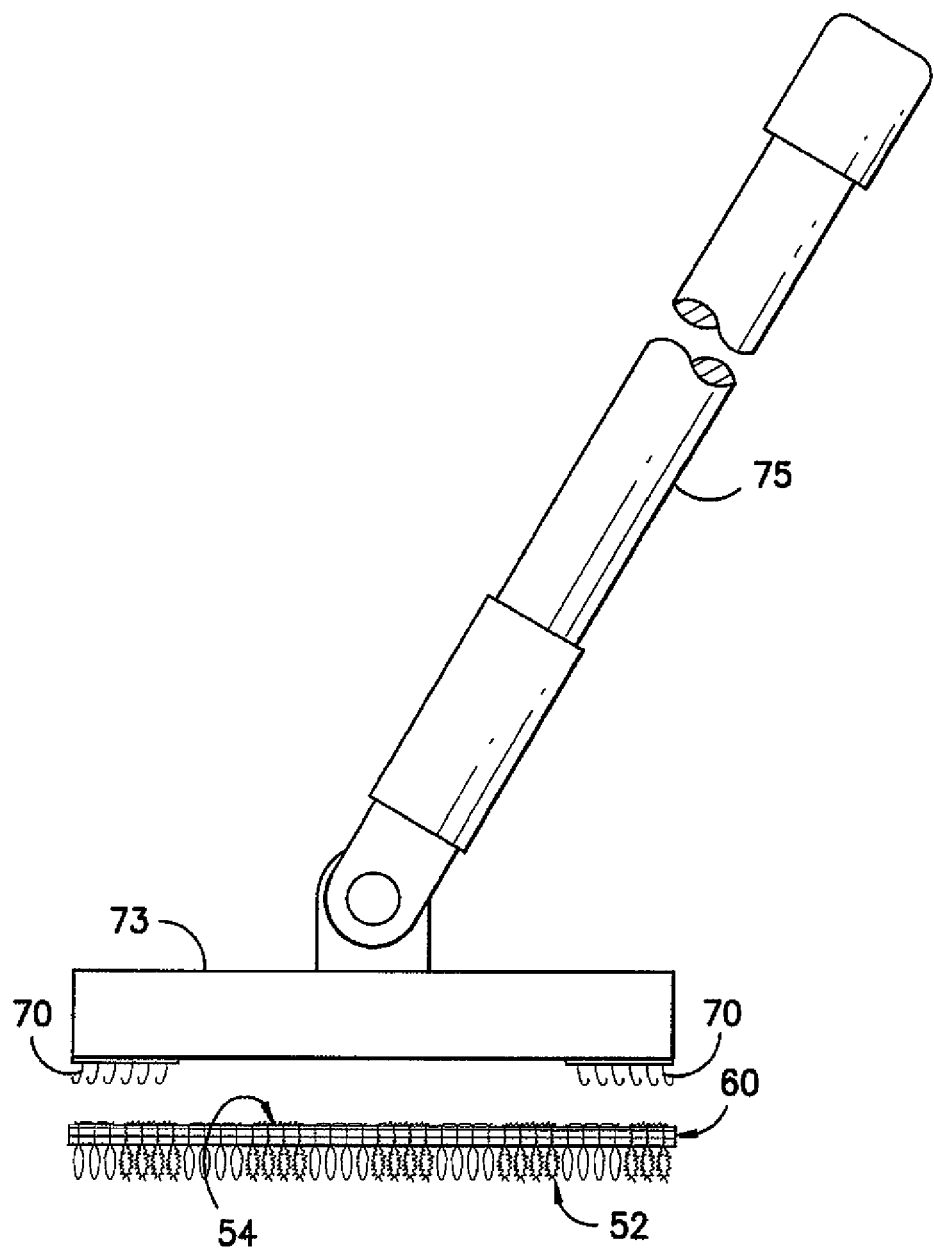
FIG. —4—

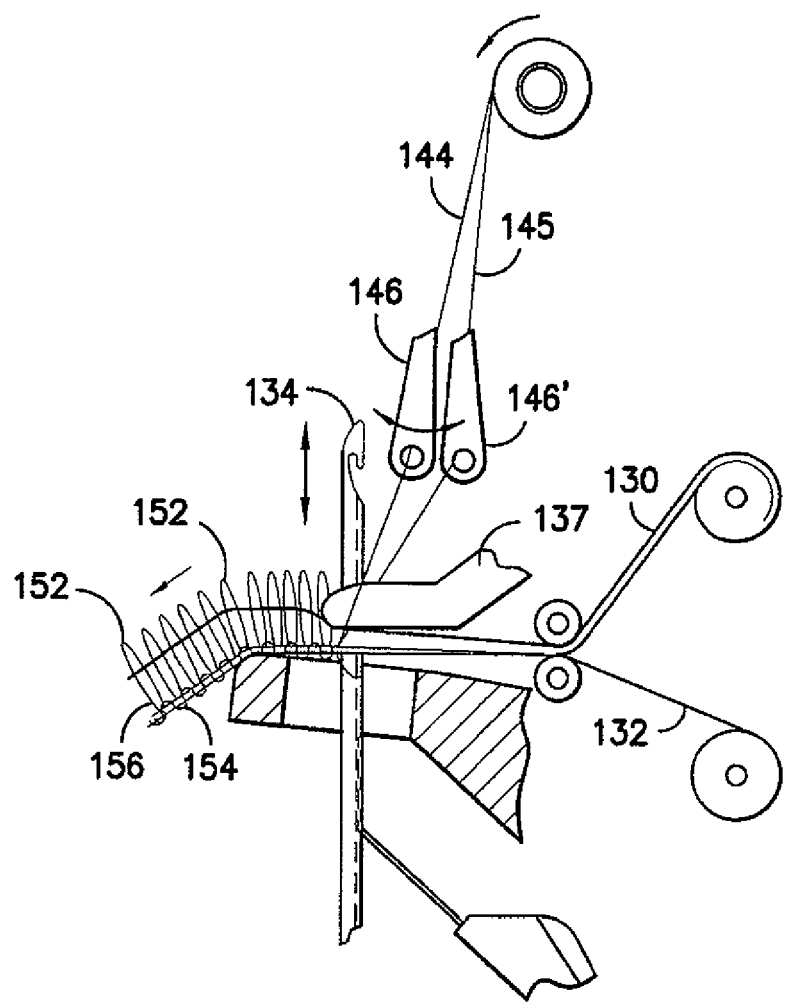
FIG. -5-

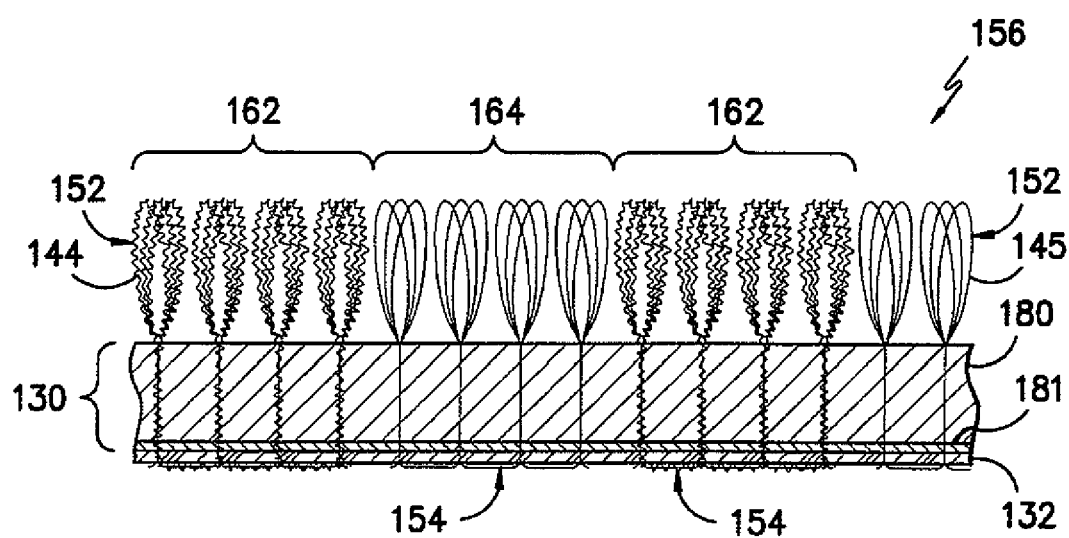
FIG. -6-

CLEANING SYSTEM INCORPORATING STITCH BONDED CLEANING PAD WITH MULTI-FILAMENT STITCHES

CROSS-REFERENCE TO RELATED APPLICATIONS

This application claims priority under 35 U.S.C. § 120 to, and is a continuation of, co-pending non-provisional application Ser. No. 17/181,545 (now U.S. Pat. No. 11,464,386) filed Feb. 22, 2021, which claims the benefit of and priority from non-provisional application Ser. No. 16/023,613 filed Jun. 29, 2018 (now U.S. Pat. No. 10,925,457) which itself claims the benefit of and priority from non-provisional application Ser. No. 15/640,921 filed 3 Jul. 2017 (now U.S. Pat. No. 10,010,233) which itself claims the benefit of and priority from non-provisional application Ser. No. 14/733,551 filed 8 Jun. 2015 (now U.S. Pat. No. 9,693,668) which itself claims the benefit of and priority from non-provisional application Ser. No. 14/517,228 filed 17 Oct. 2014 (now U.S. Pat. No. 9,049,974) which itself claims the benefit of and priority from non-provisional application Ser. No. 12/761,818 (now U.S. Pat. No. 8,863,347) filed 16 Apr. 2010, which itself claims the benefit of and priority from U.S. Provisional Application 61/170,310 filed Apr. 17, 2009 and U.S. Provisional Patent Application 61/214,547 filed Apr. 23, 2009 the contents of which are hereby incorporated by reference herein in their entirety.

TECHNICAL FIELD

The present invention relates generally to cleaning systems for floors and other surfaces, and more particularly, to cleaning systems using replaceable absorbent pads with a construction incorporating a cleaning surface overlying an absorbent interior and adapted for attachment relative to a user manipulated mop head for absorption and retention of a cleaning fluid. Exemplary non-limiting uses may include domestic or industrial cleaning of hard surfaces, floors, bathrooms, kitchens and the like.

BACKGROUND OF THE INVENTION

Fabric formation using so-called stitch bonding techniques is well known. In such processes, a multiplicity of stitching yarns is passed repeatedly in stitching relation through one or more substrate layers in closely spaced rows so as to form a coordinated arrangement of surface stitches in covering relation to the substrate. It is possible to use such stitch bonding techniques to form substantially uniform surfaces covered by the stitching yarns. It is also possible to impart patterns of stitching yarns across the surface by manipulation of the formation process. Such patterns may use upstanding loops, substantially flat stitches or combinations thereof.

It is also known to use disposable cleaning pads which are adapted to be affixed to a mop head for manipulation across a surface to be cleaned by an attached handle structure. Such pads may incorporate an arrangement of layers that are held together in stacked relation. As best understood, the layers in such prior cleaning pads perform various specific functions. In this regard, the bottom layer provides a scrubbing surface. Interior layers of fibrous material in combination with superabsorbent polymer additives serve to absorb and hold fluid from the surface being cleaned. A fluid impervious upper layer such as a polypropylene film laminated between layers of spunbonded polypropylene provides an attachment surface for connection to the mop head. By way of example only, one or more exemplary prior constructions for disposable cleaning pads are believed to be disclosed in U.S. Pat. No. 6,101,661 to Policicchio et al. the contents of which are herby incorporated in their entirety.

SUMMARY OF THE INVENTION

The present invention provides advantages and/or alternatives over the prior art by providing a pad structure of stitch bonded construction incorporating one or more substrate layers of an absorbent nonwoven material with an optional additional fluid blocking substrate layer of polymer film or other suitable material in juxtaposed relation to the absorbent nonwoven layers. Stitching yarns of multi-filament construction are introduced in stitching relation through the substrate layers. One face of the pad defines a cleaning surface of raised yarn loops formed by the stitched yarns. The pad further includes an attachment surface facing away from the cleaning surface. The stitches of yarns across the attachment surface define an engagement surface for attachment to cooperating hooking elements across a surface of a mop head to define a hook and loop attachment system.

BRIEF DESCRIPTION OF THE DRAWINGS

The accompanying drawings which are incorporated in and which constitute a part of this specification illustrate exemplary constructions and procedures in accordance with the present invention and, together with the general description of the invention given above, and the detailed description set forth below, serve to explain the principles of the invention wherein:

FIG. 1 illustrates schematically a stitch bonding system adapted to form an exemplary cleaning pad material using multiple layers of absorbent substrate material;

FIG. 2 illustrates schematically a cross-section of a segment of an exemplary cleaning pad material incorporating a plurality of stitching yarns with low dpf levels in combination with stitching yarns with higher dpf levels stitched trough multiple layers of absorbent substrate material and film backing substrate;

FIG. 3 is a schematic plan view of an exemplary cleaning pad formed from the pad material of FIG. 2, illustrating a pattern of alternating rows of stitches formed from micro-fiber stitching yarns and standard fiber stitching yarns;

FIG. 4 is a view illustrating an exemplary cleaning pad positioned for hook and loop attachment to a mop head;

FIG. 5 is a view similar to FIG. 1 illustrating schematically a stitch bonding system adapted to form an exemplary cleaning pad material using a single layer of absorbent substrate material; and FIG. 6 is a view similar to FIG. 2 illustrating schematically a cross-section of a segment of an exemplary cleaning pad material formed by the system of FIG. 5 incorporating a plurality of micro-fiber stitching yarns with low dpf levels in combination with standard fiber stitching yarns with higher dpf levels stitched through a single layer of absorbent substrate material and film backing.

While the invention has been illustrated and will hereinafter be described in connection with certain exemplary embodiments and practices, it is to be understood that in no event is the invention to be limited to such illustrated and described embodiments and practices. On the contrary, it is intended that the present invention shall extend to all alternatives and modifications as may embrace the general principles of this invention within the full and true spirit and scope thereof.

DESCRIPTION OF THE PREFERRED EMBODIMENTS

Turning now to the drawings, FIG. 1 illustrates one method utilized to form an exemplary cleaning pad adapted for attachment to hook elements projecting from a mop head. In the illustrated practice, a first layer 30 of nonwoven absorbent substrate material and a second layer 31 of nonwoven absorbent substrate material are conveyed to a stitch-forming position in a stitch bonding apparatus as will be well know to those of skill in the art. As will be appreciated, in the stitch bonding apparatus, a pattern of rows of stitches is formed by passing stitching yarns through the substrate materials such that the stitching yarns cooperatively form at least a partial covering of stitches across the substrate.

By way of example only, and not limitation the first and second layers of nonwoven absorbent substrate material may be an air laid thermobonded nonwoven material formed predominantly of hydrophilic cellulosic fiber constituents with supplemental levels of thermoplastic binders. One such material which has been found to be suitable is sold under the trade designation VIZORB X819 by Buckeye Technolgies Inc. having a place of business in Memphis, Tennessee, USA. However, other materials may likewise be suitable. According to a potentially preferred practice, such material does not include super absorbent gelling polymer to enhance absorption. However, such a gelling polymer may be included if desired.

According to one exemplary practice, the first layer 30 and the second layer 31 of nonwoven absorbent substrate material may each be substantially identical. It is also contemplated that layers of different character may be used if desired. In this regard, in accordance with one exemplary embodiment, the first layer 30 and the second layer 31 of nonwoven absorbent substrate material may each have a mass per unit area of about 50 to 400 grams per square meter and more preferably about 100 to about 200 grams per square meter and most preferably about 155 grams per square meter. The first layer 30 and the second layer 31 of nonwoven absorbent substrate material may each have an average thickness in the range of about 2 to about 5 millimeters. Of course, while the process is illustrated as using two layers of nonwoven absorbent substrate material, it is likewise contemplated that a greater or lesser number of layers may be used if desired.

In the exemplary practice illustrated in FIG. 1, a fluid barrier material 32 of substantially fluid impermeable material such as LDPE film or the like is conveyed in juxtaposed relation below the second layer 31 of nonwoven absorbent substrate material. That is, in the illustrated arrangement the fluid barrier material 32 is disposed at the so called "technical face" of the stitch bonded structure being formed. In this arrangement, the fluid barrier material 32 defines an additional substrate layer through which stitching yarns are passed. If desired, the fluid barrier material 32 may be printed for visibility beneath applied stitches across the rear surface of the formed pad as will be described further hereinafter. In accordance with one exemplary embodiment, the fluid barrier material 32 is a single layer 1 mil thick LDPE film with a mass per unit area of about 23 grams per square meter, although materials with different thicknesses and/or weights may be used if desired. In this regard, while LDPE may be a desirable fluid barrier material, it is also contemplated that any number of other substantially fluid impermeable materials may be used if desired. It is also contemplated that the fluid barrier material may be made up of multiple layers if desired. By way of example only, alternative materials may include woven or non-woven fibrous materials as well as composites with one or more layers of film in layered relation with one or more layers of fibrous material. It is likewise contemplated that the fluid barrier material 32 may be eliminated if desired.

As will be readily understood by those of skill in the art, in the stitch bonding apparatus the stitch forming position is defined by a row of reciprocating needles 34 extending in adjacent relation to one another across the width of the substrate material substantially transverse to the direction of movement of the substrate materials 30, 31, 31. As will be appreciated, while only a single needle has been illustrated, in actual practice a large number of such needles are arranged in close relation to one another in the cross machine direction. It is contemplated that the so called gauge or needle density in the cross machine direction may be adjusted as desired. By way of example only, and not limitation, it is contemplated that the needle density may be in the range of about 7 to about 28 needles per inch and more preferably about 14 needles per inch although higher and lower needle densities may likewise be used if desired. The stitch bonding apparatus will preferably be fully threaded within stitching zones such that each needle engages a stitch-forming yarn. Fingers 37 of a sinker bar are disposed between needles 34 such that the stitch-forming yarns are formed into loops across the technical back.

According to the illustrated practice, a single bar may be used to form a patterned arrangement of raised loop stitches through the stacked substrate materials 30, 31, 32. In the illustrated single bar practice, a multiplicity of first stitching yarns 44 is carried through a first group of yarn guides 46 (only one shown) carried by a front guide bar in a fully threaded pattern for cooperative engagement with a first group of the needles 34 across the width of the stacked substrate materials. In accordance with one embodiment, the first stitching yarns may have a linear density of about 60 denier to about 400 denier, although higher or lower levels may be used if desired. According to one embodiment, a multiplicity of second stitching yarns 45 of different character may be threaded through a second group of yarn guides 46' (only one shown) which are also carried by the front guide bar for cooperative engagement with a second group of the needles 34. The second stitching yarns may have a linear density of about 60 denier to about 400 denier, although higher or lower levels may be used if desired. Thus, the first stitching yarns and the second set of stitching yarns may cooperatively form a patterned repeat across the width of the machine to yield stitch zones of different character based on the character of the yarns in those stitch zones.

In accordance with one exemplary practice, both the first stitching yarns 44 and the second stitching yarns 45 are stitched through the substrate layers 30, 31, 32 using a stitch notation such as (1–0, 2–1)/or the like. During the stitch formation practice, the stitching yarns 44, 45 are looped over the sinker fingers 37 as they pass between adjacent reciprocating needles thereby producing an arrangement of surface loops 52 projecting outwardly away from the so called "technical back" and flat locking stitches 54 across the so called "technical face" of the resultant stitch-bonded pad material 56. In accordance with one exemplary embodiment, a pile sinker height of about 2 to 6 millimeters (most preferably 4 millimeters) may be used although greater or lesser heights may be used if desired. Following stitching, the resultant stitch-bonded pad material 56 may be segmented in the machine and cross-machine directions to yield a cleaning pad 60 (FIG. 4) with desired dimensions and having a cross section corresponding to that shown in FIG. 2. In the final construction the surface loops 52 cooperatively define a cleaning face in the pad 60 and the flat locking stitches 54 cooperatively form a backing surface in the pad 60 for attachment to a mop head. As will be appreciated, while the cleaning pad 60 is shown as generally rectangular, the stitch-bonded pad material 56 may be segmented to provide virtually any shape as may be desired.

As indicated, the use of two or more different stitching yarns may be used to form surface loops 52 and locking stitches 54 of different surface character across the width of the formed pad material 56 and the resulting cleaning pad 60. According to one exemplary embodiment, the first stitching yarns 44 may be so called "micro-fiber yarns" of multi-filament construction. Such micro-fiber yarns are formed from ultrafine fiber of less than 1 denier per filament (dpf). Such yarns are characterized by a soft feel and very high effective surface area. In this regard, such micro-fiber yarns may be made up of at least a predominant percentage of fiber with a dpf level of less than 0.8 and will more preferably be made up of at least a predominant percentage of fiber with a dpf level of less than 0.6 and will most preferably be made up of at least a predominant percentage of fiber with a dpf level of less than 0.4 when evaluated on a weight basis. That is, according to the potentially preferred practice, 51% or more of the fiber weight in the first stitching yarns may made up of fibers with these dpf levels. In accordance with one exemplary embodiment, such micro-fiber yarns may be formed substantially entirely from fiber with a dpf level of about 0.4 or less. By way of example only, and not limitation, one micro-fiber yarn construction for use as the first stitching yarns 44 is a 1/150/408 (i.e. 150 denier, 408 filament) textured polyester yarn. While polyester may be potentially desirable for the micro-fiber yarns, other natural or synthetic materials including nylon, polypropylene, cotton or blends of any identified materials also may be used if desired.

According to one exemplary embodiment, the second stitching yarns 45 are multi-filament yarns incorporating at least a predominant percentage of fiber with a dpf level of greater than about 2. Such yarns will be substantially stiffer and more abrasive than the low dpf micro-fiber yarns. The second stitching yarns 45 will preferably be made up of at least a predominant percentage of fiber with a dpf level of greater than 3 and will most preferably be made up of at least a predominant percentage of fiber with a dpf level of greater than 4 when evaluated on a weight basis. That is, according to the potentially preferred practice, 51% or more of the fiber weight in the second stitching yarns 45 may be made up of fibers with these dpf levels. In accordance with one exemplary embodiment, the second stitching yarns 45 may be formed substantially entirely from fiber with a dpf level of greater than 4. By way of example only, and not limitation, one yarn construction for use as the second stitching yarns 45 is a 1/150/34 (i.e. 150 denier, 34 filament) textured polyester yarn. While polyester may be potentially desirable for the second stitching yarns, other natural or synthetic materials including nylon, polypropylene, cotton or blends of any identified materials may also be used if desired.

According to a potentially desirable practice, the second stitching yarns 45 are made up predominantly (on a weight percentage basis) from fibers characterized by a dpf level which is at least 3 times greater than the dpf level of the ultrafine fibers in the first stitching yarns. More preferably, the second stitching yarns 45 are made up predominantly (on a weight percentage basis) from fibers characterized by a dpf level which is at least 5 times greater than the dpf level of the ultrafine fibers in the first stitching yarns. Most preferably, the second stitching yarns 45 are made up predominantly (on a weight percentage basis) from fibers characterized by a dpf level which is at least 10 times greater than the dpf level of the ultrafine fibers in the first stitching yarns. As described below, the use of first stitching yarns 44 and second stitching yarns 45 with substantially different dpf levels results in stitch zones of different abrasive character across the surface of the final stitch bonded cleaning pad 60.

As noted previously, the stitch bonding apparatus may be threaded such that a multiplicity of the first stitching yarns 44 engages with a first group of the needles 34 across the width of the stacked substrate materials and a set of the second stitching yarns 45 engages a second group of the needles 34 to form a repeating stitch pattern in the cross-machine direction. By way of example only and not limitation, one such repeating pattern is made up of 4 ends of the first stitching yarn 44 (150 denier/408 filament textured polyester) followed by 4 ends of the second stitching yarn 45 (150 denier/34 filament textured polyester). This pattern is repeated across the width of the substrate to provide a first set of rows 62 of stitches formed by the high filament count micro-fiber first stitching yarns 44 in adjacent, alternating relation to a second set of rows 64 of stitches formed by the standard filament second stitching yarns 45. This exemplary striped patterned arrangement is best illustrated in FIGS. 2 and 3.

As will be appreciated, the first set of rows 62 of stitches formed by the high filament count micro-fiber first stitching yarns 44 are relatively soft and are characterized by a very high surface area. During a cleaning operation, such character is believed to be beneficial in attracting and retaining particulate matter at the surface of the cleaning pad 60. Thus, the first set of rows 62 define particle retention zones across the looped surface of the cleaning pad 60. Conversely, the second set of rows 64 of stitches formed by the standard filament second stitching yarns 45 have a more abrasive character with lower surface area. During a cleaning operation, such character is believed to be beneficial in loosening matter from a surface to be cleaned by scrubbing action. Thus, the second set of rows 64 define scrubbing zones across the looped surface of the cleaning pad 60.

Of course, it is to be understood that while a repeating pattern of four ends of the micro-fiber first stitching yarns 44 followed by four ends of the standard filament second stitching yarns 45 may provide a desirable striped pattern of scrubbing zones alternating with particle retention zones, any number of other threading arrangements may likewise be used to provide desired patterning. Accordingly, a greater or lesser number of ends may be used to form each of the zones and the scrubbing zones may be of different width from the particle retention zones. It is also contemplated that the width of the scrubbing zones and/or the particle retention zones may vary across the surface if desired. That is, some scrubbing zones may be wider than others and some particle retention zones may be wider than others to provide desired performance characteristics.

While the use of micro-fiber yarns in combination with standard filament yarns may be desirable in many environments of use, it is also contemplated that first stitching yarns 44 and second stitching yarns 45 may each be formed from predominantly from fibers with dpf levels greater than 1. That is, no micro-fiber yarns are used. In such a construction, patterning providing relatively softer and coarser zones may still be achieved by use of yarns with different dpf levels in various zones even if those dpf levels are all greater than one. Likewise, it is also contemplated that first stitching yarns 44 and second stitching yarns 45 may each be formed from predominantly from fibers with dpf levels less than 1. That is, only, micro-fiber yarns are used. In such a construction, patterning providing relatively softer and coarser zones may still be achieved by use of yarns with different dpf levels in various zones even if those dpf levels are all less than one.

While the use of a two yarn system is illustrated, it is also contemplated that three or more yarns of different character may be used at different zones in the cross-machine direction to provide desired performance characteristics. By way of example only, and not limitation, it is contemplated that a third yarn (not shown) such as a high denier monofilament or the like may be threaded to needles at selected zones to provide abrasive scrubbing strips at zones near the edges of a formed pad or at such other positions as may be desired. Likewise, yarns of other character may be placed as desired. Moreover, while striped patterns may be desirable, it is also contemplated that other pattern arrangements may be used with zones of micro-fiber yarn loops and standard filament yarn loops at different locations if desired. By way of example only, and not limitation exemplary techniques for forming various patterns in a stitch-bonded product are described in U.S. Pat. No. 6,855,392, the contents of which are incorporated by reference herein in their entirety. In this regard, it is contemplated that in applying such techniques to the present invention, yarns with different dpf levels may be applied in different loop zones to provide a desired pattern of coarse and soft loop zones across the surface of the cleaning pad 60.

It is also contemplated that a single yarn system of either standard filament yarn or micro-fiber yarns may be used if desired. In such a construction, a common yarn type may be used throughout the structure. In such a construction, the yarn loops may be either continuous or discontinuous (i.e. with loop-free zones) across the surface.

As noted, in the cleaning pad 60, the combination of soft and coarse surface loops in a pattern across a cleaning surface is believed to provide a substantial benefit. Specifically, the loops of coarse character may provide beneficial scouring action while the softer loops of high surface area may tend to entrap and retain small diameter particles. In addition to the cleaning benefits, the use of multi-filament stitching yarns disposed at zones across the pad material may also aid in securing a resultant cleaning pad 60 to a mop head 73 for use in combination with an elongate handle structure 75 (FIG. 4). Specifically, the high surface area multi-filament stitching yarns 44, 45 aids in the ability of the flat locking stitches 54 across the technical face to engage hooking elements 70 projecting away from a surface of the mop head 73. By way of example only, and not limitation, FIG. 4 illustrates the attachment of an exemplary cleaning pad 60 incorporating surface loops 52 projecting outwardly and opposing locking stitches 54 disposed across the underside. The high surface area of the locking stitches 54 formed from the multi-filament stitching yarns acts to engage and hold corresponding hooking elements 70 projecting downwardly from a mop head 73 during a mopping operation.

By way of example only, during a mopping operation the cleaning pad 60 may be adjoined to the mop head 73 by the hook and loop attachment system. During the cleaning procedure, A user grasping the handle structure 75 may manipulate the mop head 73 and attached cleaning pad 60 across a floor or other surface to be cleaned. In the illustrated and potentially desirable arrangement, the rows 62, 64 are oriented substantially transverse to the normal travel direction of the mop head 73 during a mopping operation. However, the cleaning pad 60 may be segmented from the stitch bonded pad material 56 such that the rows 62, 64 may be at any angle as may be desired.

Typically, the surface to be cleaned will be treated with a liquid cleaning solution which is used to dissolve dirt, reduce friction and to provide a fluid transport mechanism for conveyance of the dissolved dirt away from the floor or other surface being cleaned. In this regard, the liquid cleaning solution may be applied by any suitable technique as may be desired. Upon contacting the liquid cleaning solution, the cleaning pad provides relatively rapid absorption by capillary action along the stitching yarns and into the layers 30, 31 of nonwoven absorbent substrate material where it is retained. At the same time, the scrubbing zones formed by rows 64 of standard filament yarn act to scrub the surface to be cleaned and to loosen attached particles. A portion of these particles may dissolve and be taken up with the cleaning fluid into the layers 30, 31 of nonwoven absorbent substrate material. Particles that are not transferred with the cleaning solution into the nonwoven absorbent substrate material may be retained at the particle retention zones formed by the of micro-fiber yarn across the face of the cleaning pad 60. Once the layers 30, 31 of nonwoven absorbent substrate material are fully saturated, the cleaning pad may be removed for disposal.

As noted previously, the stitch bonded cleaning pad 60 may include a relatively light weight film or other fluid barrier material 32 disposed in juxtaposed relation to the absorbent substrate material. Such a film or other fluid barrier material 32 provides a retaining barrier to block expulsion of absorbed cleaning fluid held by the layers 30, 31 of nonwoven absorbent substrate material. Surprisingly, it has been found that this blocking action remains effective despite the substantial perforation by the stitching yarns 44, 45. While the mechanisms for this performance characteristic are not fully understood, it is believed that gravitational forces in combination with the hydrophobic character of the stitching yarns may prevent substantial wicking along the stitching yarns in a direction away from the absorbent substrate material.

Of course, it is contemplated that the present invention is susceptible to numerous alternatives. By way of example only, and not limitation, FIGS. 5 and 6 illustrate one alternative formation practice and resultant construction wherein elements corresponding to those previously described are designated by like reference numerals increased by 100. In this arrangement, a single composite substrate layer 130 is used in place of the two layer construction previously described. Specifically, as best seen though joint reference to FIGS. 5 and 6, first stitching yarns 144 of micro-fiber construction and second stitching yarns 145 of standard fiber construction are stitched through the composite substrate layer 130 and an adjacent film or other fluid barrier material 132 as previously described.

In the embodiment illustrated in FIG. 6, the composite substrate layer 130 includes a main body portion 180 of an air laid thermobonded nonwoven formed predominantly of hydrophilic cellulosic fiber constituents with supplemental levels of thermoplastic binders. The composite substrate layer 130 further includes a stabilizing tissue layer 182 of spun bonded polypropylene or other suitable material. The stabilizing tissue layer 182 is integral with the main body portion 180. One such composite substrate layer 130 which has been found to be suitable is believed to be available under the trade designation Stream Liner X938-1 from Buckeye Technolgies Inc. having a place of business in Memphis, Tennessee, USA. However, other materials may likewise be suitable. According to one exemplary practice, the main body portion 180 has a mass per unit area of about 310 grams per square meter and the integrated tissue layer has a mass per unit area of about 17 grams per square meter. The overall composite substrate layer 130 has a thickness of about 4 mm. The resultant formed pad material 156 and cleaning pads formed from such material will perform in the same manner as previously described.

Of course, variations and modifications of the foregoing are within the scope of the present invention. Thus, it is to be understood that the invention disclosed and defined herein extends to all alternative combinations of two or more of the individual features mentioned or evident from the text and/or drawings. All of these different combinations constitute various alternative aspects of the invention. The embodiment described herein explain the best modes for practicing the invention and will enable others skilled in the art to utilize the invention. The claims are to be construed to include alternative embodiments and equivalents to the extent permitted by the prior art.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Various features of the invention are set forth in the following claims.

What is claimed is:

1. A cleaning pad of stitch-bonded construction adapted for attachment to a user manipulated mop head, the cleaning pad comprising:
    at least one fluid absorbing composite substrate layer comprising polypropylene in layered relation with fluid-retaining nonwoven; and
    at least a first plurality of yarns of multifilament construction comprising microdenier filaments extending in stitched relation through the fluid absorbing composite substrate layer, wherein the first plurality of yarns forms a first plurality of loops projecting outwardly away from a first side of the fluid absorbing layer, the first plurality of yarns also forming a first plurality of flat stitches in overlying relation to a second side of the fluid absorbing layer facing away from the first side, and wherein the first plurality of loops defines an operative particle retention surface for the cleaning pad and the first plurality of flat stitches defines an attachment surface for hooking engagement to the mop head.

2. The cleaning pad as recited in claim 1, wherein the first plurality of yarns are textured polyester yarns made up predominantly of microdenier filaments having a linear density of less than 0.8 denier per filament.

3. The cleaning pad as recited in claim 1, wherein the first plurality of yarns are textured polyester yarns made up predominantly of microdenier filaments having a linear density of less than 0.6 denier per filament.

4. The cleaning pad as recited in claim 1, wherein the first plurality of yarns are textured polyester yarns made up predominantly of microdenier filaments having a linear density of less than 0.4 denier per filament.

5. A cleaning system comprising a cleaning pad as recited in claim 1 in combination with a mop head operatively connected to a handle.

6. A cleaning pad of stitch-bonded construction adapted for attachment to a user manipulated mop head, the cleaning pad comprising:
    at least one fluid absorbing composite substrate layer comprising polypropylene in layered relation with fluid-retaining nonwoven;
    at least a first plurality of yarns of multifilament construction extending in patterned stitched relation through the fluid absorbing layer, the first plurality of yarns comprising an effective percentage of microdenier filaments having a linear density of less than 1 denier per filament, wherein the first plurality of yarns forms a first plurality of loops projecting outwardly away from a first side of the fluid absorbing layer, the first plurality of yarns also forming a first plurality of flat stitches in overlying relation to a second side of the fluid absorbing layer facing away from the first side, and wherein the first plurality of loops defines an operative particle retention surface for the cleaning pad and the first plurality of flat stitches defines an attachment surface for hooking engagement to the mop head; and
    at least a second plurality of yarns extending in patterned stitched relation through the fluid absorbing layer, the second plurality of yarns being made up predominantly of filaments having a linear density at least 3 times greater than the microdenier filaments in the first plurality of yarns, wherein the second plurality of yarns forms a second plurality of loops projecting outwardly away from the first side of the fluid absorbing layer, the second plurality of yarns also forming a second plurality of flat stitches in overlying relation to the second side of the fluid absorbing layer facing away from the first side.

7. The cleaning pad as recited in claim 6, wherein the second plurality of yarns are multi-filament textured polyester yarns made up predominantly of filaments having a linear density of at least 2 denier per filament.

8. The cleaning pad as recited in claim 6, wherein the first plurality of yarns are textured polyester yarns made up predominantly of microdenier filaments having a linear density of less than 0.8 denier per filament.

9. The cleaning pad as recited in claim 6, wherein the first plurality of yarns are textured polyester yarns made up predominantly of microdenier filaments having a linear density of less than 0.6 denier per filament.

10. The cleaning pad as recited in claim 6, wherein the first plurality of yarns are textured polyester yarns made up predominantly of microdenier filaments having a linear density of less than 0.4 denier per filament.

11. The cleaning pad as recited in claim 10, wherein the first plurality of yarns are characterized by a liner density in the range of 60 denier to 400 denier and the second plurality of yarns are characterized by a liner density in the range of 60 denier to 400 denier.

12. The cleaning pad as recited in claim 6, wherein the first plurality of yarns are textured polyester yarns made up predominantly of microdenier filaments having a linear density of less than 0.5 denier per filament.

13. The cleaning pad as recited in claim 6, wherein the first plurality of loops and the second plurality of loops are arranged in an alternating striped pattern across the cleaning pad.

* * * * *